US012261750B2

(12) United States Patent
Ambrose et al.

(10) Patent No.: US 12,261,750 B2
(45) Date of Patent: Mar. 25, 2025

(54) SYSTEMS AND METHODS FOR DETERMINING AND ANALYZING INFRASTRUCTURE COMPONENTS

(71) Applicant: World Wide Technology Holding Co., LLC, Maryland Heights, MO (US)

(72) Inventors: Ruben Ambrose, Washington, DC (US); Scott Lucier, Arlington, VA (US); Kevin Tyler Lowe, Edwardsville, IL (US)

(73) Assignee: WORLD WIDE TECHNOLOGY HOLDING CO., LLC, Maryland Heights, MO (US)

( * ) Notice: Subject to any disclaimer, the term of this patent is extended or adjusted under 35 U.S.C. 154(b) by 376 days.

(21) Appl. No.: 17/669,075

(22) Filed: Feb. 10, 2022

(65) Prior Publication Data

US 2022/0255807 A1    Aug. 11, 2022

Related U.S. Application Data

(60) Provisional application No. 63/148,046, filed on Feb. 10, 2021.

(51) Int. Cl.
*H04L 41/12* (2022.01)
*H04L 43/0876* (2022.01)

(52) U.S. Cl.
CPC .......... *H04L 41/12* (2013.01); *H04L 43/0876* (2013.01)

(58) Field of Classification Search
CPC .......................... H04L 41/12; H04L 43/0876
See application file for complete search history.

(56) References Cited

U.S. PATENT DOCUMENTS 6,628,304 B2 * 9/2003 Mitchell ............... G06F 3/0481
715/734
7,711,980 B1 * 5/2010 Scarpello, Jr. ...... G06F 11/2007
714/10

(Continued)

FOREIGN PATENT DOCUMENTS

CA    3206778 A1 * 8/2022 ............. H04L 41/12
EP    3531641 A1 * 8/2019 ......... H04L 41/0893

(Continued)

OTHER PUBLICATIONS

Smartscape—Application Mapping Visualization, accessed at https://www.dynatrace.com/platform/application-topology-discovery/smartscape/ (16 pages) 2021.

(Continued)

*Primary Examiner* — Eric Nowlin
(74) *Attorney, Agent, or Firm* — BRYAN CAVE LEIGHTON PAISNER LLP

(57) ABSTRACT

A system including one or more processors and one or more non-transitory computer-readable media storing computing instructions that, when executed on the one or more processors, perform certain acts. The acts can include receiving information corresponding to a plurality of components in an information technology environment. The acts also can include determining a relationship between a first component of the plurality of components and a second component of the plurality of components based on the information, the relationship based on overlapping information corresponding to the first component and the second component. The acts additionally can include generating a marker for the relationship based on determining a threshold level of correlation between the information corresponding to the first component and the second component. The acts additionally can include auditing the relationship between the first com- (Continued)

ponent and the second component to determine if the marker is to be updated. Other embodiments are described.

20 Claims, 13 Drawing Sheets

(56) References Cited

U.S. PATENT DOCUMENTS

| | | | | |
|---|---|---|---|---|
| 7,970,904 | B2* | 6/2011 | Behrendt | H04L 41/0806 |
| | | | | 709/226 |
| 9,225,610 | B2* | 12/2015 | Murase | G06F 3/04817 |
| 9,246,773 | B2* | 1/2016 | Degioanni | H04L 41/22 |
| 9,432,270 | B2* | 8/2016 | Degioanni | G06F 11/323 |
| 9,954,740 | B2* | 4/2018 | Degioanni | G06F 11/3495 |
| 10,181,981 | B2* | 1/2019 | Degioanni | H04L 41/14 |
| 10,320,626 | B1 | 6/2019 | Cross et al. | |
| 10,326,826 | B1* | 6/2019 | Fitzgerald | H04L 67/34 |
| 10,333,820 | B1 | 6/2019 | Wang et al. | |
| 11,025,590 | B1* | 6/2021 | Kovenat | H04L 41/0894 |
| 11,159,599 | B2* | 10/2021 | Greifeneder | H04L 67/62 |
| 11,190,404 | B2* | 11/2021 | Quintin | H04L 61/2567 |
| 11,711,264 | B2* | 7/2023 | Barnum | H04L 41/046 |
| | | | | 370/254 |
| 2008/0005330 | A1* | 1/2008 | Behrendt | H04L 41/0806 |
| | | | | 709/226 |
| 2008/0249970 | A1* | 10/2008 | Behrendt | H04L 41/0806 |
| | | | | 706/46 |
| 2011/0167411 | A1 | 7/2011 | Wada et al. | |
| 2015/0039745 | A1* | 2/2015 | Degioanni | G06F 11/3495 |
| | | | | 709/224 |
| 2015/0052441 | A1* | 2/2015 | Degioanni | H04L 43/045 |
| | | | | 715/734 |
| 2016/0337199 | A1* | 11/2016 | Degioanni | G06F 11/3065 |
| 2018/0248767 | A1* | 8/2018 | Degioanni | H04L 41/14 |
| 2018/0321977 | A1* | 11/2018 | Moore | G06F 11/321 |
| 2019/0260645 | A1* | 8/2019 | Quintin | H04L 41/12 |
| 2020/0044940 | A1* | 2/2020 | Thomasson | H04L 41/085 |
| 2020/0204470 | A1* | 6/2020 | Movsisyan | H04L 43/0817 |
| 2020/0382370 | A1* | 12/2020 | Barnum | H04L 41/046 |
| 2021/0203567 | A1* | 7/2021 | Hoopes | H04L 43/0817 |
| 2021/0399948 | A1* | 12/2021 | Barnum | H04L 41/0873 |
| 2022/0060445 | A1* | 2/2022 | Kovenat | H04L 63/0209 |
| 2023/0198860 | A1* | 6/2023 | Bothwell | H04L 43/10 |
| | | | | 709/224 |
| 2023/0396493 | A1* | 12/2023 | Barnum | H04L 41/046 |

FOREIGN PATENT DOCUMENTS

| | | | | |
|---|---|---|---|---|
| EP | 3531641 B1 * | 10/2020 | | H04L 41/0893 |
| WO | WO-2015016989 A1 * | 2/2015 | | G06F 11/3006 |
| WO | WO-2022162465 A1 * | 8/2022 | | H04L 41/12 |

OTHER PUBLICATIONS

Virima—Discovery + Service Mapping 4 pages 2021.

* cited by examiner

Shared Infrastructure By Component

▽ Hide  ▽ Clear  ⇩ Export Results

\* Field  \* Operator  Value  Results/Page

[Field ▽]  [Operator ▽]  [Run Filter]  [50 ▽]

| Shared Component ▽ | Linked Applications ▽ |
|---|---|
| FinancialFirewall | HR Portal, Payroll |
| FinancialLoadBalancer | HR Portal, Payroll |
| FinancialShared | HR Portal, Payroll |
| trafficgen9 | Banyan, HR Portal |

Showing 1-4 of 4

| Item ▽ | Old ▽ | New ▽ | By ▽ | Timestamp ▵ | Action ▽ |
|---|---|---|---|---|---|
| Categorized Relationsh... | Depends On C-WebSer... | | admin | 11/17/2020 3:37:18 PM EST | Relationship Remove |
| Inferred Relationship | Known Component C... | | admin | 11/17/2020 3:37:18 PM EST | Inferred Relationship Remove |
| Inferred Relationship | | Potential Component d... | admin | 11/17/2020 3:37:18 PM EST | Inferred Relationship Add |
| Inferred Relationship | | Potential Component d... | ServiceNow | 11/16/2020 9:06:23 PM EST | Inferred Relationship Add |
| Inferred Relationship | | Potential Component d... | ServiceNow | 11/15/2020 9:06:15 PM EST | Inferred Relationship Add |
| Inferred Relationship | | Potential Component d... | ServiceNow | 11/14/2020 9:06:18 PM EST | Inferred Relationship Add |
| Inferred Relationship | | Potential Component d... | ServiceNow | 11/13/2020 9:06:30 PM EST | Inferred Relationship Add |
| Inferred Relationship | | Potential Component d... | ServiceNow | 11/12/2020 9:06:01 PM EST | Inferred Relationship Add |
| Inferred Relationship | | Potential Component d... | ServiceNow | 11/11/2020 9:06:18 PM EST | Inferred Relationship Add |
| Categorized Relationsh... | | Depends On C-WebSer... | admin | 11/10/2020 9:06:16 PM EST | Relationship Add |
| Inferred Relationship | | Known Component C... | admin | 11/10/2020 3:37:16 PM EST | Inferred Relationship Add |

FIG. 12

Drift Report 1300

| Scope ▽ | Item | Old | New | By | Timestamp | Action |
|---|---|---|---|---|---|---|
| ☐ > C-Database (1) | | | | | | |
| ☐ > Crucial App (3) | | | | | | |
| ☐ > devcorpsite02 (86) | | | | | | |
| ☐ ⌄ host-008 (6) | | | | | | |
| | Categorized... | ☐ | Communicat... ☐ | ServiceNow | 10/07/2020 9:06:17 PM EST | Relationship Add |
| | Categorized... | ☐ | Depends On ... ☐ | ServiceNow | 10/07/2020 9:06:17 PM EST | Relationship Add |
| | Categorized... | ☐ | Communicat... ☐ | ServiceNow | 10/06/2020 9:06:17 PM EST | Relationship Add |
| | Categorized... | ☐ | Depends On ... ☐ | ServiceNow | 10/06/2020 9:06:17 PM EST | Relationship Add |
| | Categorized... | ☐ | Communicat... ☐ | ServiceNow | 10/05/2020 9:06:40 PM EST | Relationship Add |
| | Categorized... | ☐ | Depends On ... ☐ | ServiceNow | 10/05/2020 9:06:40 PM EST | Relationship Add |
| ☐ > Servers Audit History (4) | | | | | | |
| ☐ > trafficgen2 (112) | | | | | | |
| ☐ > trafficgen3 (43) | | | | | | |
| ☐ > trafficgen4 (404) | | | | | | |
| ☐ > trafficgen5 (274) | | | | | | |
| ☐ > trafficgen8 (6) | | | | | | |

Showing 1-10 of 10                    Results/Page 50 ▷

FIG. 13

SYSTEMS AND METHODS FOR DETERMINING AND ANALYZING INFRASTRUCTURE COMPONENTS

CROSS-REFERENCE TO RELATED APPLICATIONS

This application claims benefit to U.S. Provisional Patent Application No. 63/148,046 filed on Feb. 10, 2021. The content of the above-identified application is incorporated by reference herein in its entirety.

TECHNICAL FIELD

This disclosure relates generally to determining and analyzing infrastructure components.

BACKGROUND

Many organizations have large information technology (IT) estates. These IT estates include a vast number of networked connected devices (e.g., infrastructure components) that communicate with one another to maintain critical functions of the IT estate. Additionally, these network connected devices may rely on other networked connected devices that they are not in communication with in order to maintain the critical functions of the IT estate.

BRIEF DESCRIPTION OF THE DRAWINGS

To facilitate further description of the embodiments, the following drawings are provided in which:

FIG. 11 illustrates an exemplary user interface display to allow the user of FIG. 3 to customize the infrastructure analysis system of FIG. 3;

FIG. 12 illustrates an exemplary user interface display to allow the user of FIG. 3 to customize the infrastructure analysis system of FIG. 3; and FIG. 13 illustrates an exemplary user interface display to allow the user of FIG. 3 to customize the infrastructure analysis system of FIG. 3.

Figure 1:
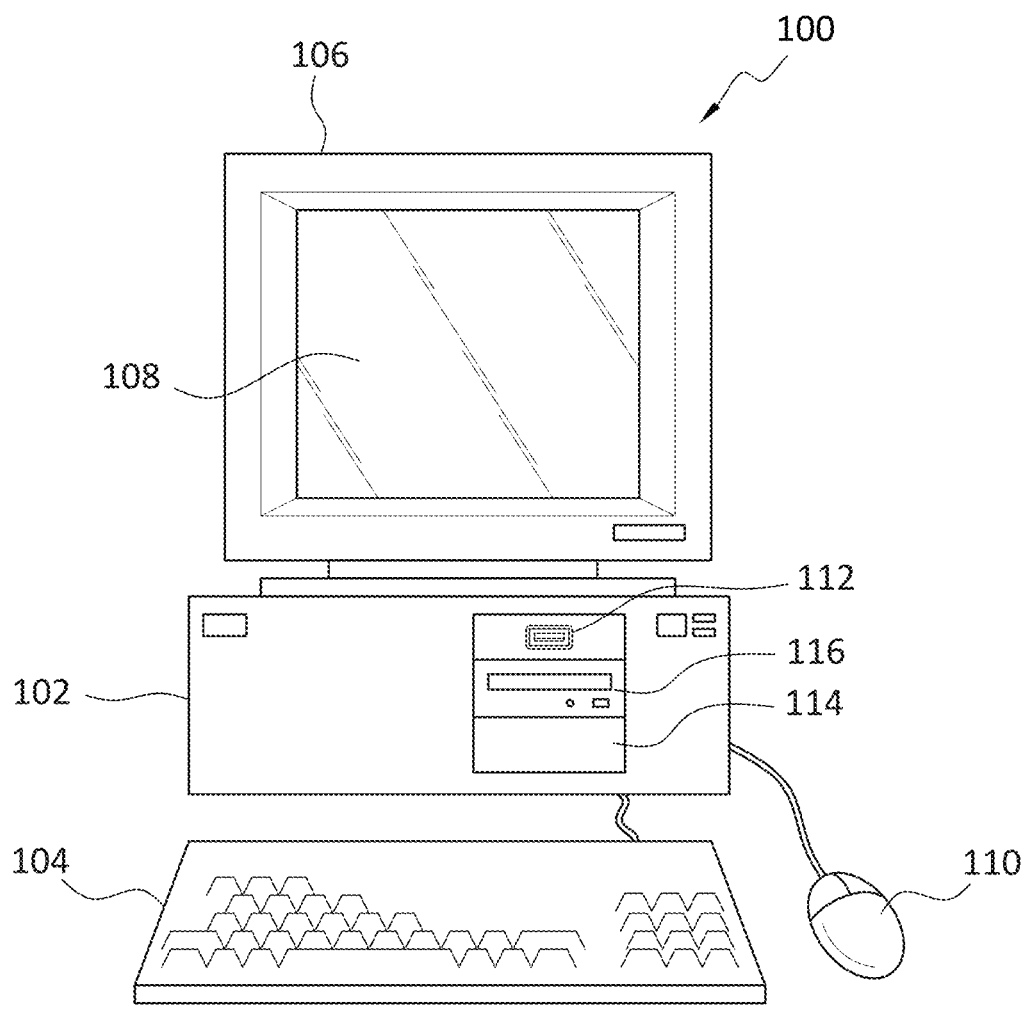
FIG. 1 illustrates a front elevational view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Figure 2:
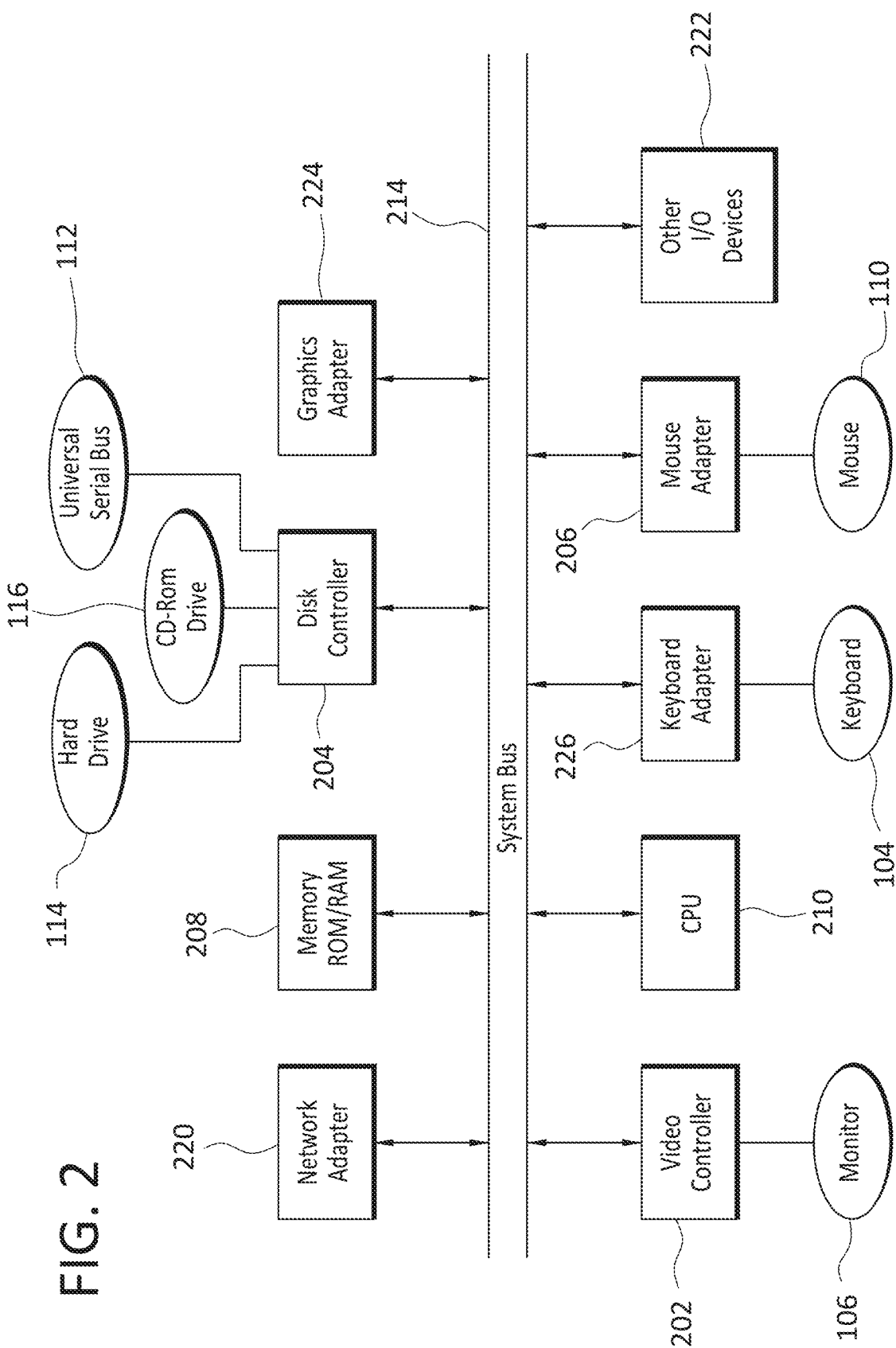
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or CD-ROM, DVD, Blu-Ray, or other suitable media, such as media configured to be used in CD-ROM and/or DVD drive 116 (FIGS. 1-2). Non-volatile or non-transitory memory storage unit(s) refer to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can include one or more of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, California, United States of America, or (v) the Windows Mobile™ operating system by Microsoft Corp. of Redmond, Washington, United States of America.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 1) and the circuit boards inside chassis 102 (FIG. 1) are not discussed herein.

When computer system 100 in FIG. 1 is running, program instructions stored on a USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computing device 100, and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
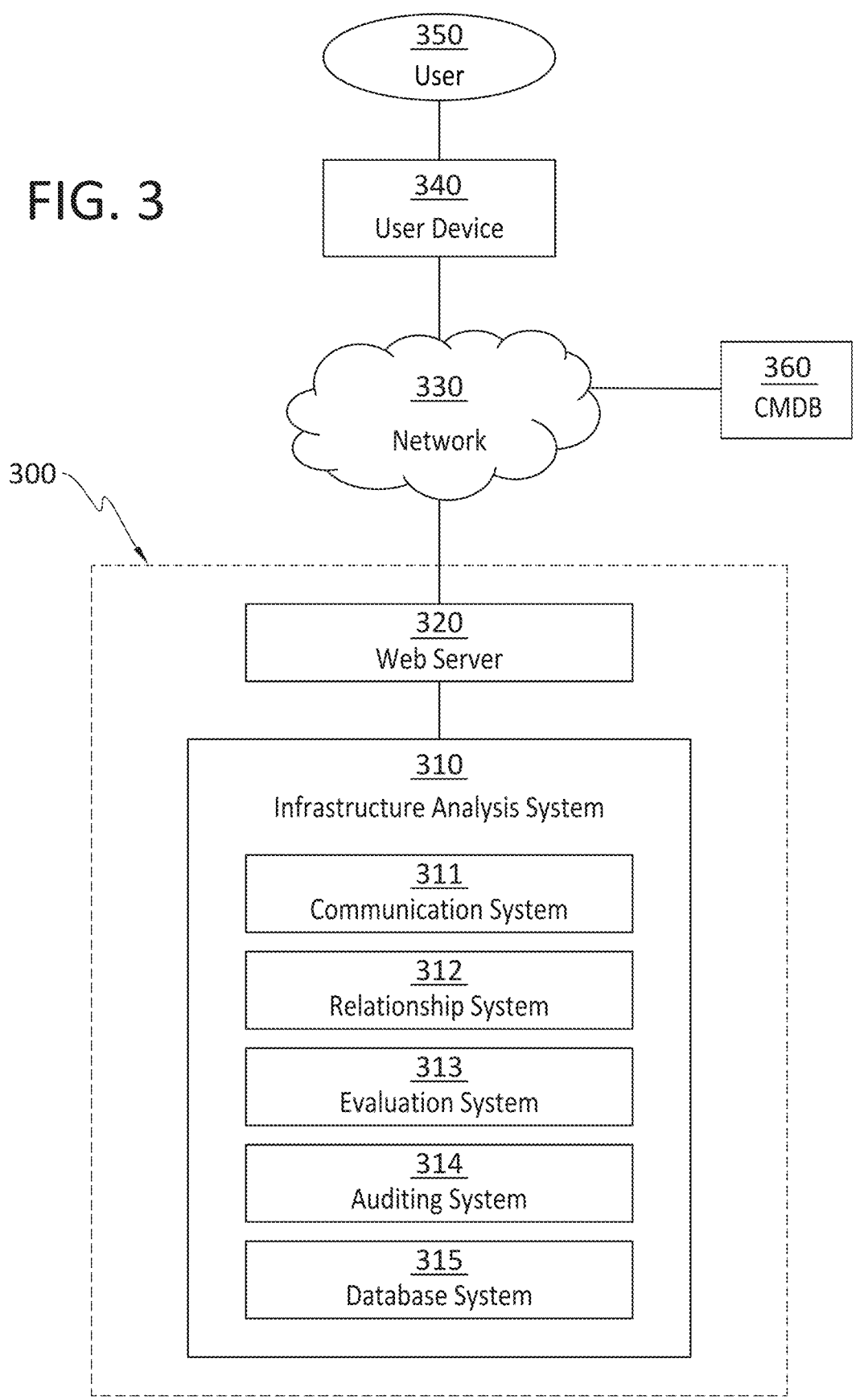
FIG. 3 illustrates a block diagram of a system that can be employed for determining and analyzing infrastructure components, according to an embodiment.

Turning ahead in the drawings, FIG. 3 illustrates a block diagram of a system 300 that can be employed for determining and analyzing infrastructure components, according to an embodiment. System 300 is merely exemplary and embodiments of the system are not limited to the embodiments presented herein. The system can be employed in many different embodiments or examples not specifically depicted or described herein. In some embodiments, certain elements, modules, or systems of system 300 can perform various procedures, processes, and/or activities. In other embodiments, the procedures, processes, and/or activities can be performed by other suitable elements, modules, or systems of system 300. In some embodiments, system 300 can include an infrastructure analysis system 310 and/or web server 320.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

Infrastructure analysis system 310 and/or web server 320 can each be a computer system, such as computer system 100 (FIG. 1), as described above, and can each be a single computer, a single server, or a cluster or collection of computers or servers, or a cloud of computers or servers. In another embodiment, a single computer system can host infrastructure analysis system 310 and/or web server 320. Additional details regarding infrastructure analysis system 310 and/or web server 320 are described herein.

In some embodiments, web server 320 can be in data communication through a network 330 with one or more user devices, such as a user device 340. User device 340 can be part of system 300 or external to system 300. Network 330 can be the Internet or another suitable network. In some embodiments, user device 340 can be used by users, such as a user 350. In many embodiments, web server 320 can host one or more websites and/or mobile application servers. For example, web server 320 can host a web site, or provide a server that interfaces with an application (e.g., a mobile application), on user device 340, which can allow users (e.g., 350) to interact with infrastructure components in an IT environment, in addition to other suitable activities. In a number of embodiments, web server 320 can interface with infrastructure analysis system 310 when a user (e.g., 350) is viewing infrastructure components in order to assist with the analysis of the infrastructure components.

In some embodiments, an internal network that is not open to the public can be used for communications between infrastructure analysis system 310 and web server 320 within system 300. Accordingly, in some embodiments, infrastructure analysis system 310 (and/or the software used by such systems) can refer to a back end of system 300 operated by an operator and/or administrator of system 300, and web server 320 (and/or the software used by such systems) can refer to a front end of system 300, as is can be accessed and/or used by one or more users, such as user 350, using user device 340. In these or other embodiments, the operator and/or administrator of system 300 can manage system 300, the processor(s) of system 300, and/or the memory storage unit(s) of system 300 using the input device(s) and/or display device(s) of system 300.

In certain embodiments, the user devices (e.g., user device 340) can be desktop computers, laptop computers, mobile devices, and/or other endpoint devices used by one or more users (e.g., user 350). A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Exemplary mobile devices can include (i) an iPod®, iPhone®, iTouch®, iPad®, MacBook® or similar product by Apple Inc. of Cupertino, California, United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, California, United States of America, (ii) the Blackberry® operating system by Research In Motion (RIM) of Waterloo, Ontario, Canada, (iii) the Android™ operating system developed by the Open Handset Alliance, or (iv) the Windows Mobile™ operating system by Microsoft Corp. of Redmond, Washington, United States of America.

In many embodiments, infrastructure analysis system 310 and/or web server 320 can each include one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to infrastructure analysis system 310 and/or web server 320 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of recommendation system 310 and/or web server 320. In a similar manner, the processors and/or the non-transitory computer-readable media can be local and/or remote to each other.

Meanwhile, in many embodiments, infrastructure analysis system 310 and/or web server 320 also can be configured to communicate with one or more databases, such as a database system 315. The one or more databases can include information about hardware and/or software assets (e.g., configuration items) used in an IT environment, for example, among other information, as described below in further detail. The one or more databases can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more databases, that particular database can be stored on a single memory storage unit or the contents of that particular database can be spread across multiple ones of the memory storage units storing the one or more databases, depending on the size of the particular database and/or the storage capacity of the memory storage units.

The one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

In some embodiments, infrastructure analysis system 310 and/or web server 320 also can be configured to communicate with one or more databases, such as a configuration management database (CMDB) 360. The CMDB 360 can include information about hardware and/or software assets (e.g., configuration items) used in an IT environment, for example, among other information, as described below in further detail. The CMDB 360 can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, the contents of CMDB 360 can be stored on a single memory storage unit or can be spread across multiple ones of the memory storage units, depending on the size of CMDB 360 and/or the storage capacity of the memory storage units.

The CMDB 360 can include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, infrastructure analysis system 310, web server 320, and/or the one or more databases (e.g., database system 315, CMDB 360) can be implemented using any suitable manner of wired and/or wireless communication. Accordingly, system 300 can include any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

In many embodiments, infrastructure analysis system 310 can include a communication system 311, a relationship system 312, an evaluation system 313, an auditing system 314, and/or database system 315. In many embodiments, the systems of infrastructure analysis system 310 can be modules of computing instructions (e.g., software modules) stored at non-transitory computer readable media that operate on one or more processors. In other embodiments, the systems of infrastructure analysis system 310 can be implemented in hardware. Infrastructure analysis system 310 and/or web server 320 each can be a computer system, such as computer system 100 (FIG. 1), as described above, and can be a single computer, a single server, or a cluster or collection of computers or servers, or a cloud of computers or servers. In another embodiment, a single computer system can host infrastructure analysis system 310 and/or web server 320. Additional details regarding infrastructure analysis system 310 and the components thereof are described herein.

Conventionally, many large organizations accumulate significant technical debt over time. Technical debt can occur when organizations do not prioritize budget and/or time to modernize their information technology (IT) estate. At a minimum, many organizations merely patch or improve small parts of the IT environment. This minimal effort can result in a deviation of the original design, but this approach is unfortunately most commonly employed for mission critical environments in which maintenance opportunities are sparse. If modernizing environments is neglected for a number of years, the problem can become a significant challenge. In addition, losing critical staff that understand the environments can exacerbate these problems.

If an organization does not have an accurate understanding of their current IT estate, modernization attempts are typically flawed, as incorrect assumptions can be made based on such misunderstandings. The industry, regardless of vertical, is replete with examples of projects that run longer than anticipated, are under-funded, or suffer from unforeseen change or cyber-related outages. The most problematic part is usually found in IT environments that are way past their economic useful life.

Conventional tools lack the ability to accurately understand, map, and report back on how different infrastructure components are tethered together, especially when applications are tenanted across on-premise, hybrid cloud and private cloud instances. Therefore, organizations typically buy a number of tools, such as sniffers, crawlers, application monitoring, end-point agents, etc., to understand how their infrastructure and applications are tethered together. The problem this presents is the sheer volume of information and differing output results. Some organizations have built custom 'data lakes' to try and provide an automated solution, which typically become sizeable and somewhat unmanageable.

In many embodiments, system 300 can address these problems by determining and analyzing infrastructure components to show the single source of truth on how one application or system is dependent on another within an IT environment (e.g., one or more data centers of a company). In many embodiments, system 300 can generate an aggregated view of many data sources, and not just the output of one discovery tool or agent. The information can be used to create an understanding of a large-scale technology estate. In several embodiments, system 300 can receive and correlate various telemetry sources, such as network traffic tools, network telemetry tools, network nodes (e.g., routers, switches, etc.) supporting the NetFlow protocol, etc.

In a number of embodiments, system 300 can be implemented on a system (e.g., computer system 100 (FIG. 1)), which can be employed in many different embodiments or examples not specifically depicted or described herein. In some embodiments, certain elements, modules, or services of system 300 can perform various procedures, processes, and/or activities. In other embodiments, the procedures, processes, and/or activities can be performed by other suitable elements, modules, or services of the system. System 300 can be implemented within hardware and/or software. In some embodiments, part or all of the hardware and/or software can be conventional, while in these or other embodiments, part or all of the hardware and/or software can be customized (e.g., optimized) for implementing part or all of the functionality of the system described herein. In many embodiments, the system can be a single computer, a single server, or a cluster or collection of computers or servers, or a cloud of computers or servers.

Figure 4:
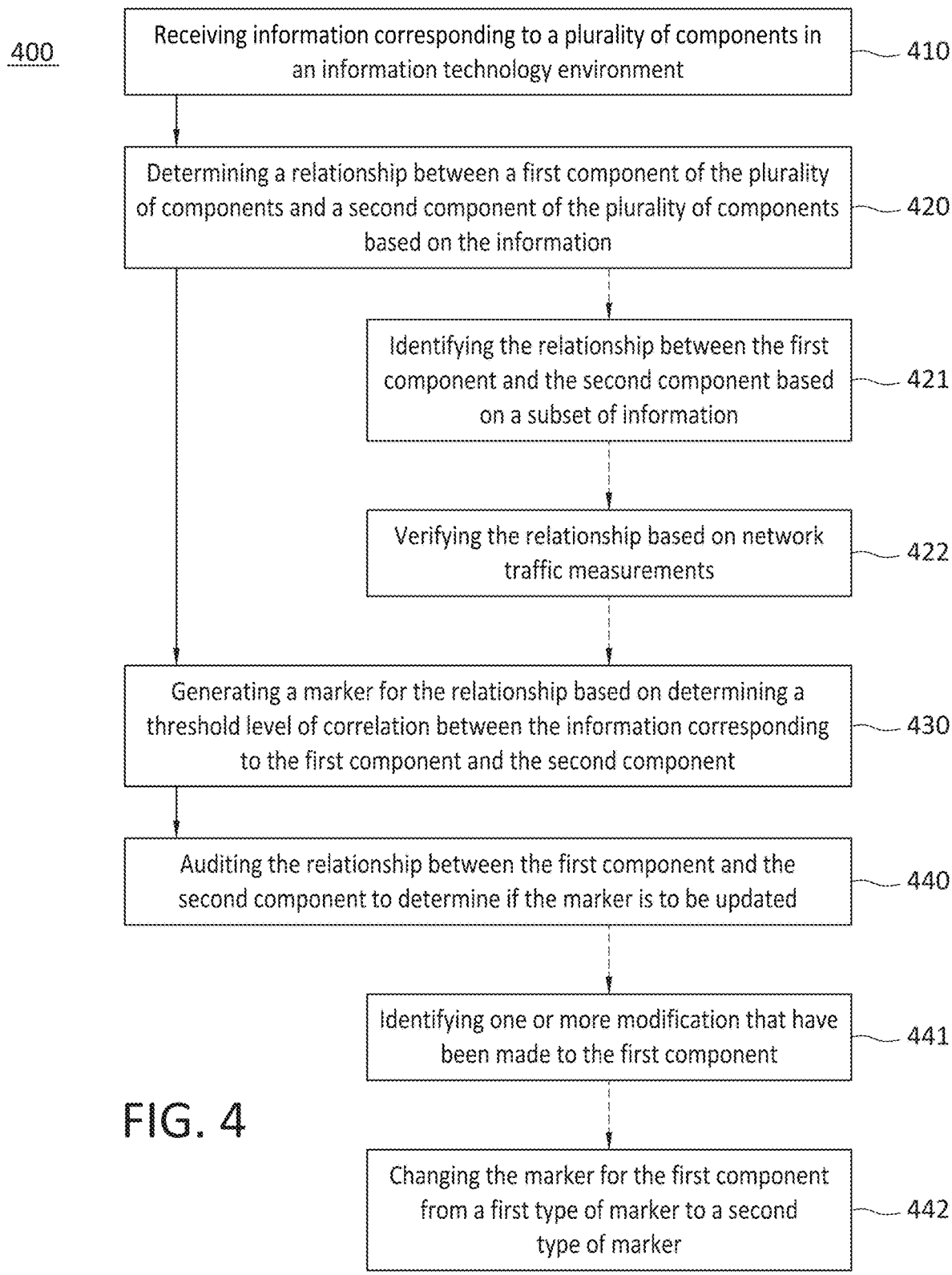
FIG. 4 illustrates a flow chart for a method, according to an embodiment.

Turning ahead in the drawings, FIG. 4 illustrates a flow chart for a method 400, according to an embodiment. In some embodiments, method 400 can be a method of determining and analyzing infrastructure components. Method 400 is merely exemplary and is not limited to the embodiments presented herein. Method 400 can be employed in many different embodiments or examples not specifically depicted or described herein. In some embodiments, the procedures, the processes, and/or the activities of method 400 can be performed in the order presented. In other embodiments, the procedures, the processes, and/or the activities of method 400 can be performed in any suitable order. In still other embodiments, one or more of the procedures, the processes, and/or the activities of method 400 can be combined or skipped.

In many embodiments, system 300 (FIG. 3), infrastructure analysis system 310 (FIG. 3), and/or web server 320 (FIG. 3) can be suitable to perform method 400 and/or one or more of the activities of method 400. In these or other embodiments, one or more of the activities of method 400 can be implemented as one or more computing instructions configured to run at one or more processors and configured to be stored at one or more non-transitory computer readable media. Such non-transitory computer readable media can be part of system 300 (FIG. 3). The processor(s) can be similar or identical to the processor(s) described above with respect to computer system 100 (FIG. 1).

In some embodiments, method 400 and other activities in method 400 can include using a distributed network including distributed memory architecture to perform the associated activity. This distributed architecture can reduce the impact on the network and system resources to reduce congestion in bottlenecks while still allowing data to be accessible from a central location.

Referring to FIG. 4, method 400 can include an activity 410 of receiving information corresponding to a plurality of components in an information technology environment. In some embodiments, the information includes at least one of telemetry data, network traffic measurements, or internet protocol addresses. In some embodiments, system 300 (FIG. 3) can ingest the information (e.g., data, a subset of data, etc.) from database system 315 and/or CMDB 360 (FIG. 3) that stores information about hardware and/or software assets (e.g., configuration items) used in an IT environment.

In several embodiments, method 400 can include an activity 420 of determining a relationship between a first component of the plurality of components and a second component of the plurality of components based on the information. In some embodiments, activity 420 can include an activity 421 of identifying the relationship between the first component and the second component based on a subset of information. In various embodiments, activity 420 can include an activity 422 of verifying the relationship based on network traffic measurements. In some embodiments, verifying the relationship is further based on obtaining information about communications between an internet protocol address corresponding to the first component and an internet protocol address corresponding to the second component for a first time period.

Figure 5:
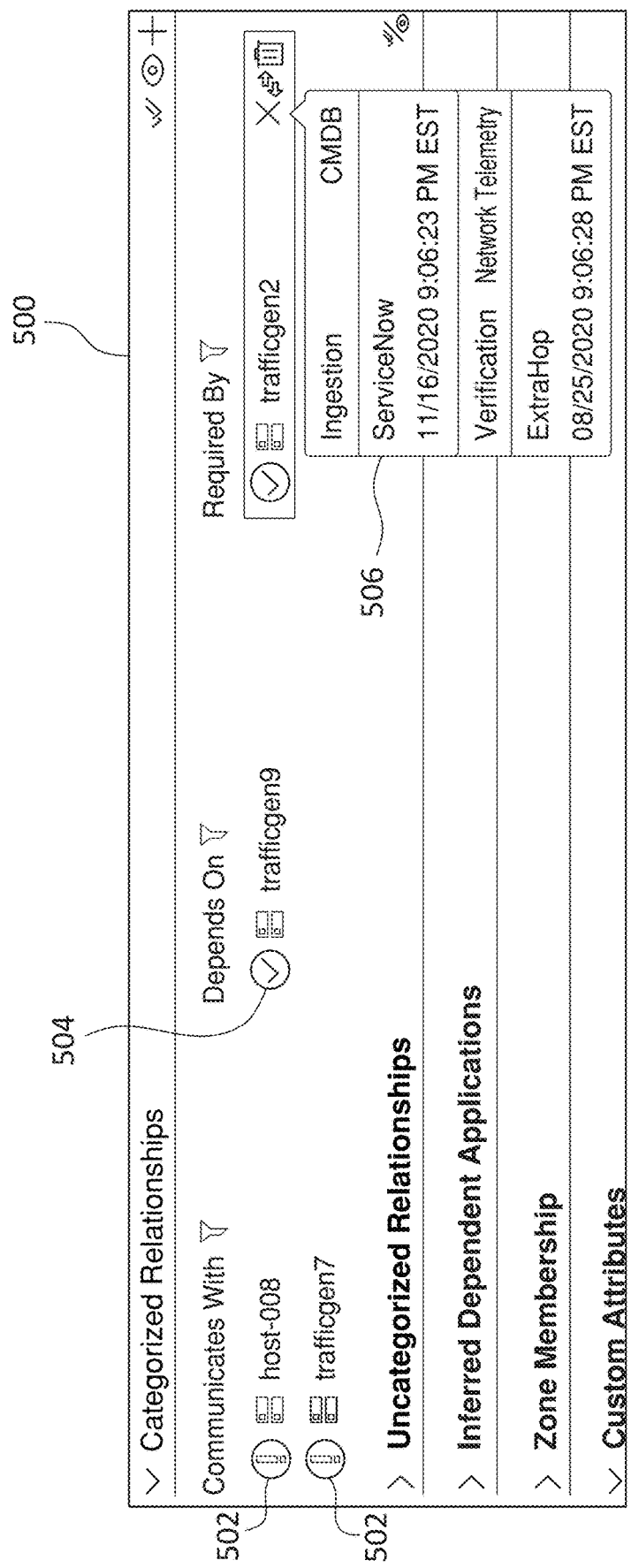
FIG. 5 illustrates an exemplary user interface display to allow the user of FIG. 3 to customize the infrastructure analysis system of FIG. 3.

In several embodiments, system 300 (FIG. 3) can import data from the CMDB 360 to the database system 315 to identify any components in an IT environment, their IP (internet protocol) addresses, and any known relationships between those components. The components each can be a server or another component in an IT environment. System 300 can then import data from a network telemetry tool, and using the IP address information from the CMDB 360, can automatically verify for every component that relationships the CMDB 360 says exist are confirmed by tangible network traffic. Relationships between a subject component and other components can be imported from the CMDB 360 and classified in different flavors of relationships. Turning briefly to FIG. 5, a user interface 500 illustrates a categorized relationships system for a subject component (e.g., trafficgen3). System 300 can ingest from the CMDB 360 that the subject component (e.g., trafficgen3): (1) communicates with two components, e.g., host-0008 and trafficgen7; (2) depends on one component, e.g., trafficgen9; and/or (3) is required by one component, e.g., trafficgen2. FIG. 5 also illustrates markers 502 and 504. The marker 502 is a first type of marker which indicates that this relationship is not verified. The marker 504 is a second type of marker that indicates that this relationship is verified. The flavor of the relationship can be ingested from the CMDB 360.

Returning to FIG. 4, the method 400 can include an activity 430 of generating a marker for the relationship based on determining a threshold level of correlation between the information corresponding to the first component and the second component. In some embodiments, the relationship is based on overlapping information corresponding to the first component and the second component. In a number of embodiments, the ingested relationships that are verified based on network telemetry data are marked with a green check mark symbol, and the ingested relationships that are not verified based on network telemetry data are marked with a red exclamation mark symbol. A user (e.g., user 350 (FIG. 3) of system 300 (FIG. 3) can click on a related component that is verified, such as trafficgen2, to view information about the sources that provided the information to system 300 (FIG. 3) for ingestion and verification. For example, as shown in FIG. 5, the relationship between the subject component (e.g., trafficgen3) and trafficgen2 was ingested from a first source, e.g., a ServiceNow CMDB 360, and was verified from a second source, e.g., an ExtraHop telemetry system as illustrated in a window 506. In many embodiments, system 300 (FIG. 3) can communicate with the network telemetry tools to obtain information about communications between the IP address for the subject component (e.g., trafficgen3) and the IP address for the related component during a suitable time period (e.g., the last 30 days) for verifying the relationship between the components based on network telemetry data.

Additionally, method 400 can include an activity 440 of auditing the relationship between the first component and the second component to determine if the marker is to be updated. In some embodiments, activity 440 can include an activity 441 of identifying one or more modifications that have been made to the first component. In various embodiments, activity 440 can include an activity 442 of changing the marker for the first component from a first type of marker to a second type of marker. In some embodiments, the first type of marker corresponding to no review required and the second type of marker corresponding to review required.

Figure 6:
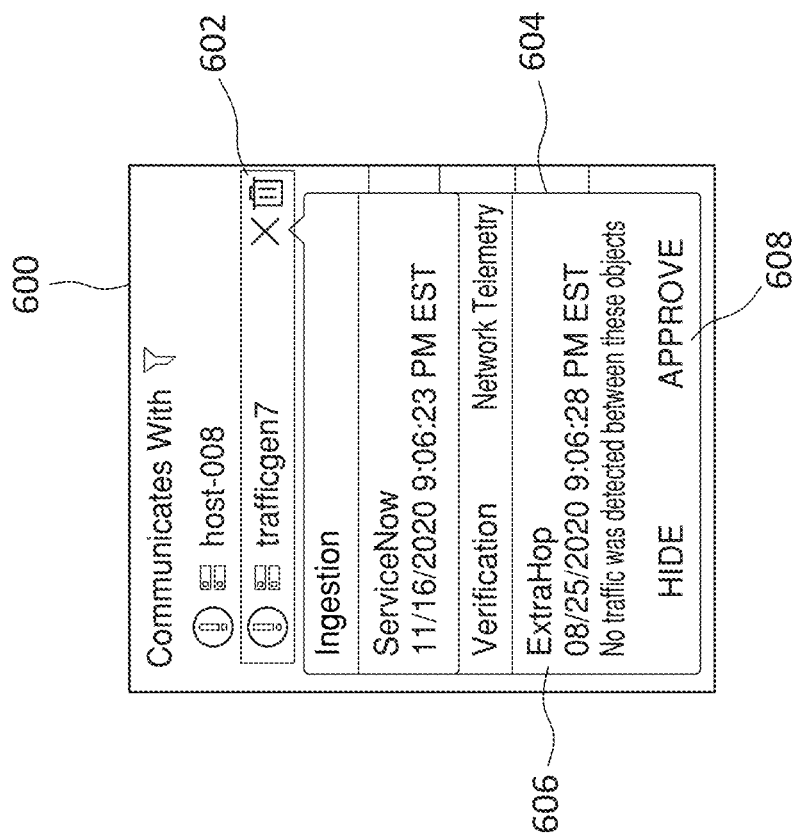
FIG. 6 illustrates an exemplary user interface display to allow the user of FIG. 3 to customize the infrastructure analysis system of FIG. 3.

Turning to FIG. 6, a user interface 600 is illustrated. In the illustrated embodiment of FIG. 6, a user 350 (FIG. 3) of system 300 (FIG. 3) can click on an unverified component 602, such as trafficgen7, to view information in window 604 about one or more sources 606 that provided the information to system 300 (FIG. 3) for ingestion and/or verification. For example, as shown in FIG. 6, the relationship between the subject component (e.g., trafficgen3) and trafficgen7 was ingested from a first source, e.g., the ServiceNow CMDB 360, but was not verified from a second source, e.g., the ExtraHop telemetry system. In such an embodiment, these unverified components can be considered inaccurate and flagged for reconciliation by a user 350 (FIG. 3) of system 300 (FIG. 3). Action items 608 are illustrated in window 604 of FIG. 6, which user 350 (FIG. 3) can select whether to hide or approve this unverified relationship.

In some embodiments, system 300 (FIG. 3) also can perform activities of monitoring the network traffic measurements, identifying a relationship between the first component and a third component of the plurality of components in the information technology environment in which the relationship between the first component and the third component not previously identified, and/or flagging the relationship between the first component and the third component for review. In some embodiments, system 300 (FIG. 3) can also perform an activity of reviewing the relationship between the first component and the third component to determine a level of reliance of the third component on the first component. In some embodiments, system 300 (FIG. 3) can perform activities of generating a marker for the relationship between the first component and the second component, displaying the level of reliance between the third component and the first component, and/or displaying a level of reliance between the first component, the second component, and other ones of the plurality of components that are in a relationship with the first component. In some embodiments, system 300 (FIG. 3) can perform activities of determining a number of components from the plurality of components that are shared by multiple applications in the information technology environment, and/or generating a taxonomy for the number of components that are shared by multiple applications.

Figure 7:
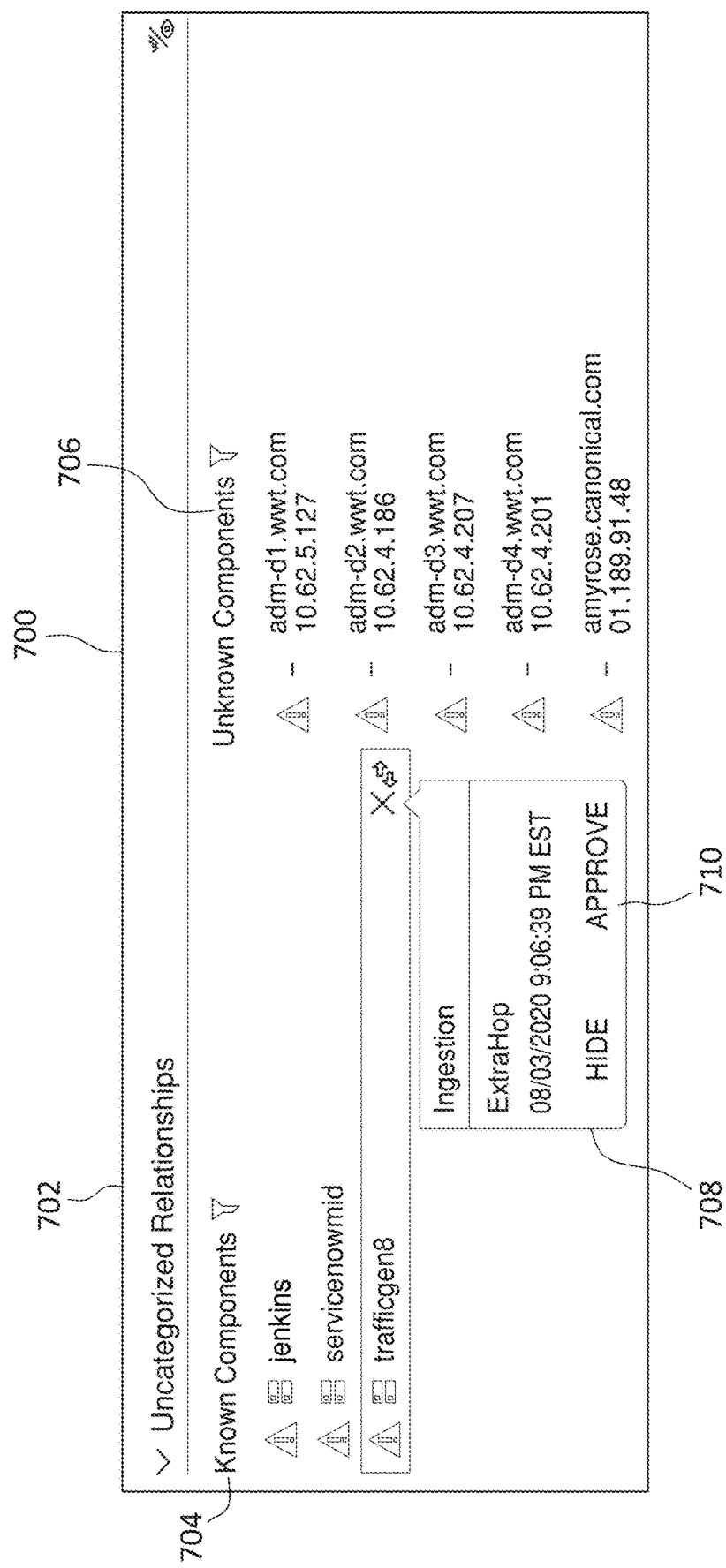
FIG. 7 illustrates an exemplary user interface display to allow the user of FIG. 3 to customize the infrastructure analysis system of FIG. 3.

In some embodiments, system 300 (FIG. 3) can detect relationships that do not exist in the CMDB 360 based on network traffic. These relationships can be identified and flagged to a user for reconciliation. Turning to FIG. 7, a user interface 700 is illustrated. In FIG. 7, an Uncategorized Relationships section 702 can list components that have a relationship with the subject component (e.g., trafficgen3) based on traffic, but for which no relationship is identified in the CMDB 360. In some embodiments, these related components can be categorized into known components 704 and unknown components 706. For known components 704, the CMDB 360 includes the component, but does not know about its relationship with the subject component (e.g., trafficgen3). For unknown components 706, the CMDB 360 does not yet know the component. As shown in FIG. 7, user 350 (FIG. 3) can click on a component to view information in a window 708 about the source of the information, such as clicking on the trafficgen8 component to see that traffic data between the subject component (e.g., trafficgen3) and trafficgen8 was provided by a source, e.g., the ExtraHop telemetry system. Window 708 also includes action items 710, which allow user 350 (FIG. 3) to select whether to hide or approve this unknown relationship.

Figure 8:
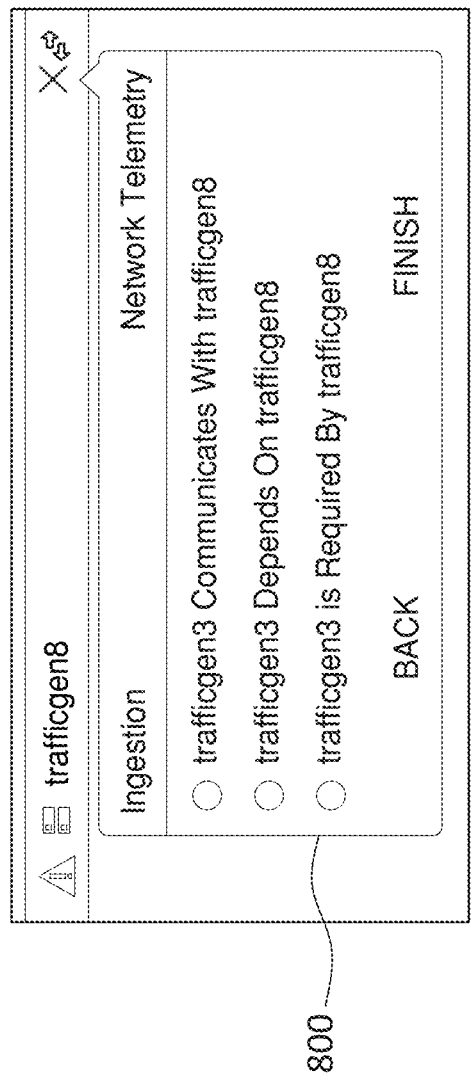
FIG. 8 illustrates an exemplary user interface display to allow the user of FIG. 3 to customize the infrastructure analysis system of FIG. 3.

Turning to FIG. 8, if user 350 (FIG. 3) chooses to approve this unknown relationship, system 300 (FIG. 3) can ask user 350 (FIG. 3) via window 800 to define the flavor of the relationship. For example, user 350 (FIG. 3) can select whether the subject component (e.g., trafficgen3) "communicates with," "depends on," or "is required by" the component (e.g., trafficgen8) with the uncategorized relationship.

In many embodiments, by analyzing the relationships known between the individual components in the environment, system 300 (FIG. 3) can automatically identify one or more of the following: 1) Which components are functioning together to support each application's existence; 2) Which components are potentially part of an application although not currently marked as such; or 3) Which applications are cross-connected and what the connections points are for the cross-connected applications.

Figure 9:
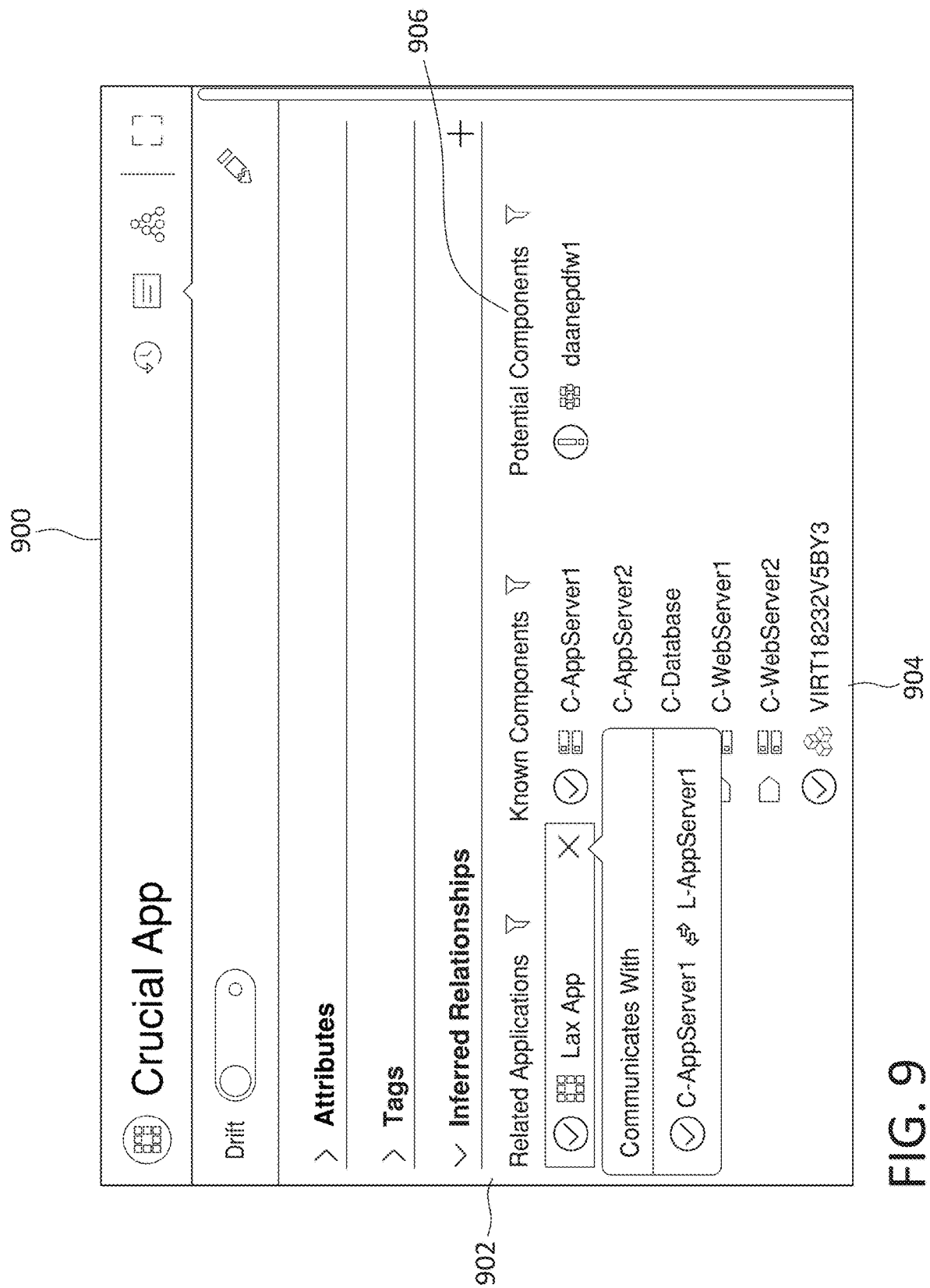
FIG. 9 illustrates an exemplary user interface display to allow the user of FIG. 3 to customize the infrastructure analysis system of FIG. 3.

Turning to FIG. 9, a user interface 900 is shown. In the illustrated embodiment of FIG. 9, system 300 (FIG. 3) can display details about an application, such as an application named "Crucial App," in a list view and a dependency map view, respectively. FIG. 9 shows a list view in an Inferred Relationships section 902 about related applications, such as an application named "Lax App," and cross-connected components C-AppServer1 and L-AppServer1, which are the connection points between Crucial App and Lax App. FIG. 9 also shows known components 904, based on the ingested and verified dependencies, as described above, and potential components 906, based on ingested but unverified dependencies, as described above.

Figure 10:
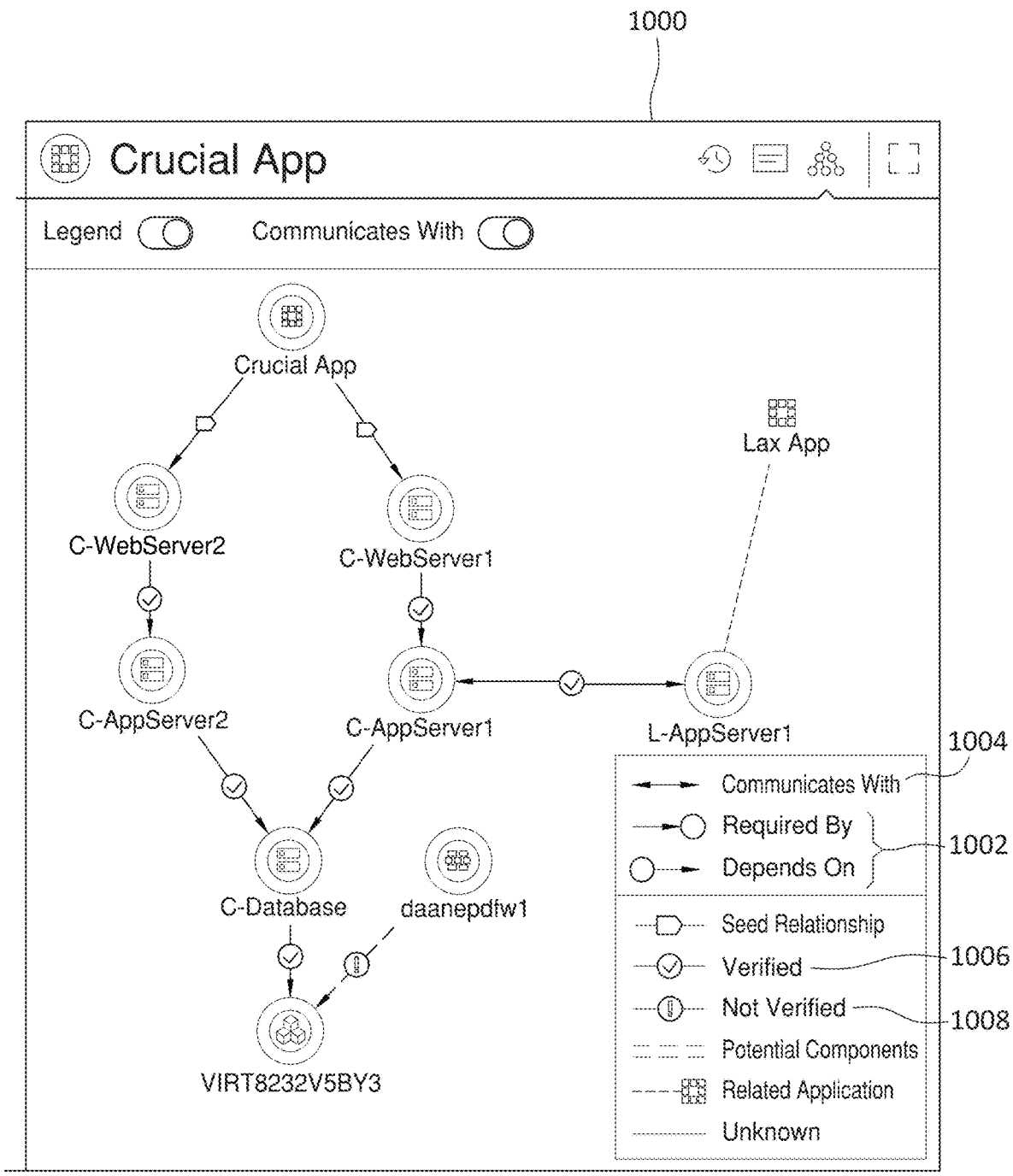
FIG. 10 illustrates an exemplary user interface display to allow the user of FIG. 3 to customize the infrastructure analysis system of FIG. 3.

Turning to FIG. 10, a user interface 1000 is shown. In the embodiment of FIG. 10, system 300 (FIG. 3) can display these dependencies in a dependency map, which is a graphical representation showing all the member components and how they are connected. As shown in FIG. 10, Crucial App has a seed relationship with components C-WebServer2 and C-WebServer1, which can be entry points to Crucial App. These seed relationships can be ingested from sources, or user 350 (FIG. 3) can input them, such as described above. The relationships determined to exist between the components can be displayed. For example, one-directional arrows 1002 can indicate hard dependencies from a first component to a second component on which the first component depends (e.g., C-WebServer2 has a hard dependency on C-AppServer2). These hard dependencies can be determined based on the relationship flavors of "required by" and/or "depends on." As another example, two-directional arrows 1004 can indicate a bidirectional relationship (e.g., C-AppServer1 has a bidirectional relationship with L-AppServer1, and these two components server as the connection point between Crucial App and Lax App). These bidirectional relationships can be determined by the relationship flavor of "communicates with."

The relationship can be listed as verified (as shown with the check mark symbol 1006, which in some embodiments can be shown in green color), or as unverified (as shown in with the exclamation mark symbol 1008, which in some embodiments can be shown in red color), based on whether or not the relationship is verified, as described above. For example, the ingested dependency of C-Database on VIRT18232V58Y3 is verified based on traffic, but the ingested dependency of daaanepdfw1 on VIRT18232V58Y3 is unverified due to lack of traffic between these components.

The Lax App is a related application in a separate dependency map. The dependency map of Lax App is not shown in the dependency map of Crucial App in FIG. 10. Instead, FIG. 10 shows the fact that Crucial App communicates with the Lax App dependency tree through L-AppServer1. The dependency map thus can show the boundaries of an application (e.g., Crucial App) and its related components. The relationships can be ingested automatically and verified automatically by traffic, where possible. The relationships can be based on information aggregated from many different, and often heterogeneous, sources, such as one or more CMDBs 360, and one or more network telemetry tools. In many embodiments, these sources can be existing tools that are already used in the IT environment prior to using the techniques described herein.

In large environments, such as enterprise environments, single components that are shared by multiple applications can be key pieces of infrastructure that have a very meaningful impact on the operations of a business. In many embodiments, system 300 (FIG. 3) can analyze the relationships between the components to automatically identify one or more of the following: 1) Which components in the environment are shared by multiple applications; or 2) Which applications are sharing those components.

Turning to FIG. 11, a user interface 1100 is shown. In the embodiment of FIG. 11, system 300 (FIG. 3) can show that the FinancialFirewall component is a shared component for both the HR Portal application and the Payroll application, which can be designated as the linked applications. Similarly, the FinancialLoadBalancer component and the Financial Shared component are both shared components for the HR Portal application and the Payroll application. The trafficgen9 component, by contrast, is a shared component for the Banyan application and the HR Portal application. In many embodiments, user 350 (FIG. 3) of system 300 (FIG. 3) can run queries of components to see which applications use the component.

Large environments, such as enterprises, typically have dynamic IT environments, with components being added and removed weekly in a typical organization. The accuracy of the output displayed by system 300 (FIG. 3), such as shown above, can depend on the accuracy of the data ingested and/or verified by system 300 (FIG. 3). In a number of embodiments, system 300 (FIG. 3) can keep track of changes made to the IT environment by auditing the components in the IT environment and the data known about those components and their relationships. In several embodiments, system 300 (FIG. 3) can identify anything material that has changed about an application and/or a component from a given point in time.

Turning to FIG. 12, a user interface 1200 is shown. In some embodiments, system 300 (FIG. 3) can allow a user to select an application, such as Crucial App, to display a list of changes that have been made to member components related to Crucial App, as shown in user interface 1200. FIG. 12 lists inferred relationships added, inferred relationships removed, etc., at an individual application level for the environment of Crucial App. These changes can be made automatically based on information continuously received from sources, such as information received by system 300 (FIG. 3) for ingestion and/or verification. A toggle 1202 at the top left of FIG. 12 can be located in the middle and/or be made yellow to indicate that there are new changes in the list since user 350 (FIG. 3) last reviewed the changes in the environment for Crucial App. New changes since user 350 (FIG. 3) last reviewed the list can be indicated in yellow, such as the top three rows 1204 under the headings in the list shown in FIG. 12. Once user 350 (FIG. 3) reviews the list of changes, user 350 (FIG. 3) can move the toggle to the right, which in some embodiments can change the color of the toggle to green, and which can indicate that the changes have all been reviewed at that point in time. Once additional changes are made, the toggle can automatically return to the center position and be changed in color to yellow, which can indicate that additional changes have been made to the environment for the Crucial App. In some embodiments, the toggle can be moved to a left position to not track new changes to the environment for Crucial App.

Turning to FIG. 13, a user interface 1300 is shown. In the same or other embodiments, changes that have been made to system 300 (FIG. 3) can be reported for the entire IT environment, such as all of the applications and/or the components in the customer environment. In the illustrated embodiment of FIG. 12, user interface 1300 shows a report for an IT environment, showing summaries of changes made for many different applications and components, and showing details of six changes related to a component, host-008, based on a user selecting that component to view the change details related to that component.

Returning to FIG. 3, in several embodiments, communication system 311 can at least partially perform activity 410 (FIG. 4) of receiving information corresponding to a plurality of components in an information technology environment.

In several embodiments, relationship system 312 can at least partially perform activity 420 (FIG. 4) of determining a relationship between a first component of the plurality of components and a second component of the plurality of components based on the information, activity 421 (FIG. 4) of identifying the relationship between the first component and the second component based on a subset of information, and/or activity 422 (FIG. 4) of verifying the relationship based on network traffic measurements.

In a number of embodiments, evaluation system 313 can at least partially perform activity 430 (FIG. 4) of generating a marker for the relationship based on determining a threshold level of correlation between the information corresponding to the first component and the second component.

In several embodiments, auditing system 314 can at least partially perform activity 440 (FIG. 4) of auditing the relationship between the first component and the second component to determine if the marker is to be updated, activity 441 (FIG. 4) of identifying one or more modifications that have been made to the first component, and/or activity 442 (FIG. 4) of changing the marker for the first component from a first type of marker to a second type of marker.

In a number of embodiments, web server 320 can at least partially perform activity 410 (FIG. 4) of receiving information corresponding to a plurality of components in an information technology environment, activity 420 (FIG. 4) of determining a relationship between a first component of the plurality of components and a second component of the plurality of components based on the information, activity 421 (FIG. 4) of identifying the relationship between the first component and the second component based on a subset of information, activity 422 (FIG. 4) of verifying the relationship based on network traffic measurements, activity 430 (FIG. 4) of generating a marker for the relationship based on determining a threshold level of correlation between the information corresponding to the first component and the second component, activity 440 (FIG. 4) of auditing the relationship between the first component and the second component to determine if the marker is to be updated, activity 441 (FIG. 4) of identifying one or more modifications that have been made to the first component, and/or activity 442 (FIG. 4) of changing the marker for the first component from a first type of marker to a second type of marker.

In many embodiments, the techniques described herein can provide a practical application and several technological improvements. In some embodiments, the techniques described herein can provide for determining and analyzing infrastructure components to mitigate technical debt and generate an aggregate view of an IT environment. These techniques described herein can provide a significant improvement over conventional approaches that fail to prioritize maintaining an efficient IT environment.

In a number of embodiments, the techniques described herein can solve a technical problem that arises only within the realm of computer networks, as analyzing infrastructure components is a concept that does not exist outside the realm of computer networks. Moreover, the techniques described herein can solve a technical problem that cannot be solved outside the context of computer networks. Specifically, the techniques described herein cannot be used outside the context of computer networks, in view of a lack of data, and the inability to train the machine-learning recommendation models without a computer.

Various embodiments can include a system including one or more processors and one or more non-transitory computer-readable media storing computing instructions that, when executed on the one or more processors, perform certain acts. The acts can include receiving information corresponding to a plurality of components in an information technology environment. The acts also can include determining a relationship between a first component of the plurality of components and a second component of the plurality of components based on the information, the relationship based on overlapping information corresponding to the first component and the second component. The acts additionally can include generating a marker for the relationship based on determining a threshold level of correlation between the information corresponding to the first component and the second component. The acts additionally can include auditing the relationship between the first component and the second component to determine if the marker is to be updated.

A number of embodiments can include a method being implemented via execution of computing instructions configured to run at one or more processors. The method can include receiving information corresponding to a plurality of components in an information technology environment. The method also can include determining a relationship between a first component of the plurality of components and a second component of the plurality of components based on the information, the relationship based on overlapping information corresponding to the first component and the second component. The method additionally can include generating a marker for the relationship based on determining a threshold level of correlation between the information corresponding to the first component and the second component. The method additionally can include auditing the relationship between the first component and the second component to determine if the marker is to be updated.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

Although determining and analyzing infrastructure components has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-13 may be modified, and that the foregoing discussion of certain of these embodiments does not necessarily represent a complete description of all possible embodiments. For example, one or more of the procedures, processes, or activities of FIG. 4 may include different procedures, processes, and/or activities and be performed by many different modules, in many different orders. As another example, the systems within system 300 (FIG. 3) can be interchanged or otherwise modified.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
   one or more processors; and
   one or more non-transitory computer-readable media storing computing instructions that, when executed on the one or more processors, perform:
   receiving first information corresponding to a plurality of components in an information technology environment, the first information including at least one of telemetry data, network traffic measurements, or internet protocol addresses;
   determining a relationship between a first component of the plurality of components and a second component of the plurality of components based on the first information, the relationship based on a direction of dependency between the first component and the second component;
   generating a marker for the relationship based on determining a threshold level of correlation between the first information corresponding to the first component and the second component;
   sending, for display on a user device, a dependency map comprising a graphical representation of directional dependency relationships between the plurality of components and markers for the directional dependency relationships, wherein the directional dependency relationships comprise the relationship between the first component and the second component, and the markers comprise the marker for the relationship between the first component and the second component; and
   auditing the relationship between the first component and the second component to determine if the marker is to be updated.

2. The system of claim 1, wherein a subset of the first information corresponding to the plurality of components is received from a configuration management database.

3. The system of claim 2, wherein determining the relationship between the first component and the second component is further based at least in part on:
   identifying the relationship between the first component and the second component based on the subset of the first information received from the configuration management database; and
   verifying the relationship based on the network traffic measurements.

4. The system of claim 3, wherein verifying the relationship is further based on obtaining second information about communications between an internet protocol address corresponding to the first component and an internet protocol address corresponding to the second component for a first time period.

5. The system of claim 1, wherein the computing instructions, when executed on the one or more processors, further perform:
   monitoring the network traffic measurements;
   identifying a relationship between the first component and a third component of the plurality of components in the information technology environment, the relationship between the first component and the third component not previously identified; and
   flagging the relationship between the first component and the third component for review.

6. The system of claim 5, wherein the computing instructions, when executed on the one or more processors, further perform reviewing the relationship between the first component and the third component to determine a level of reliance of the third component on the first component.

7. The system of claim 6, wherein the computing instructions, when executed on the one or more processors, further perform:
   generating a marker for the relationship between the first component and the second component;
   displaying the level of reliance between the third component and the first component; and
   displaying a level of reliance between the first component, the second component, and other ones of the plurality of components that are in a relationship with the first component.

8. The system of claim 1, wherein the computing instructions, when executed on the one or more processors, further perform:
   determining a number of components from the plurality of components that are shared by multiple applications in the information technology environment; and
   generating a taxonomy for the number of components that are shared by multiple applications.

9. The system of claim 1, wherein auditing the relationship is further based on:
   identifying one or more modifications that have been made to the first component; and
   changing the marker for the first component from a first type of marker to a second type of marker, the first type of marker corresponding to no review required and the second type of marker corresponding to review required.

10. The system of claim 9, wherein the one or more modifications include at least one of:
   another component of the plurality of components is determined to have a relationship with the first component, or
   network traffic between the first component and the second component does not satisfy a threshold.

11. A method implemented via execution of computing instructions configured to run at one or more processors, the method comprising:
   receiving first information corresponding to a plurality of components in an information technology environment, the first information including at least one of telemetry data, network traffic measurements, or internet protocol addresses;
   determining a relationship between a first component of the plurality of components and a second component of the plurality of components based on the first information, the relationship based on a direction of dependency between the first component and the second component;
   generating a marker for the relationship based on determining a threshold level of correlation between the first information corresponding to the first component and the second component;
   sending, for display on a user device, a dependency map comprising a graphical representation of directional dependency relationships between the plurality of components and markers for the directional dependency relationships, wherein the directional dependency relationships comprise the relationship between the first component and the second component, and the markers comprise the marker for the relationship between the first component and the second component; and
   auditing the relationship between the first component and the second component to determine if the marker is to be updated.

12. The method of claim 11, wherein a subset of the first information corresponding to the plurality of components is received from a configuration management database.

13. The method of claim 12, wherein determining the relationship between the first component and the second component is further based at least in part on:
   identifying the relationship between the first component and the second component based on the subset of the first information received from the configuration management database; and
   verifying the relationship based on the network traffic measurements.

14. The method of claim 13, wherein verifying the relationship is further based on obtaining second information about communications between an internet protocol address corresponding to the first component and an internet protocol address corresponding to the second component for a first time period.

15. The method of claim 11, further comprising:
   monitoring the network traffic measurements;
   identifying a relationship between the first component and a third component of the plurality of components in the information technology environment, the relationship between the first component and the third component not previously identified; and
   flagging the relationship between the first component and the third component for review.

16. The method of claim 15, further comprising reviewing the relationship between the first component and the third component to determine a level of reliance of the third component on the first component.

17. The method of claim 16, further comprising:
   generating a marker for the relationship between the first component and the second component;
   displaying the level of reliance between the third component and the first component; and
   displaying a level of reliance between the first component, the second component, and other ones of the plurality of components that are in a relationship with the first component.

18. The method of claim 11, further comprising:
   determining a number of components from the plurality of components that are shared by multiple applications in the information technology environment; and
   generating a taxonomy for the number of components that are shared by multiple applications.

19. The method of claim 11, wherein auditing the relationship is further based on:
   identifying one or more modifications that have been made to the first component; and changing the marker for the first component from a first type of marker to a second type of marker, the first type of marker corresponding to no review required and the second type of marker corresponding to review required.

20. The method of claim 19, wherein the one or more modifications include at least one of:
   another component of the plurality of components is determined to have a relationship with the first component, or
   network traffic between the first component and the second component does not satisfy a threshold.

* * * * *